3,012,975
Patented Dec. 12, 1961

3,012,975
EMULSIFIER FOR AQUEOUS EMULSION
POLYMERIZATION PROCESSES
Charles M. Lambert, New London, Pa., assignor to Hercules Powder Company, Wilmington, Del., a corporation of Delaware
No Drawing. Filed May 1, 1958, Ser. No. 732,149
9 Claims. (Cl. 252—352)

This invention relates to soaps of rosin and rosin-fatty acid mixtures having improved color and to a method of making same.

It has been observed that the color of soaps of rosin and rosin-fatty acid mixtures may be improved by treatment with sodium silicate. However, the use of such treated soaps in aqueous emulsion polymerization processes for the manufacture of synthetic rubber adversely affects the rate of polymerization so that any improvement in color is obtained at a sacrifice in polymerization rate.

An important object of the present invention is the provision of soaps of rosin and rosin-fatty acid mixtures having improved color and which may be used in aqueous emulsion polymerization processes without adverse effect on the rate of polymerization.

A further object of the invention is the provision of a process for improving the color of sodium and potassium soaps of rosin and rosin-fatty acid mixtures without adversely affecting other properties.

It has now been found that the color of sodium and potassium soaps of rosin and rosin-fatty acid mixtures may be improved by incorporating therein a relatively small amount, i.e. from about 0.05% to about 0.3%, based on the resin content of the soap, of a polyphosphate.

It is a particular advantage of the invention that the treatment herein described improves the color of soaps of rosin and rosin-fatty acid mixtures without adverse effects on other properties, i.e. polymerization rates when such soaps are used in aqueous emulsion polymerization processes. Moreover, the color improvement in the soaps carries over into the polymers made with these soaps. This is of great importance in the production of synthetic rubber by emulsion polymerization.

In the preparation of these soaps, the rosin or rosin-fatty acid mixture is heated to the molten state to facilitate complete reaction with the alkali. The alkali, polyphosphate and diluting water may then be combined and added to the molten resin under constant agitation. Alternatively, the molten resin may be added to the complete aqueous phase or the two phases may be brought together continuously in a mixing device. Improvement in color can also be obtained by adding a solution of the polyphosphate to a previously prepared rosin soap.

The temperature required in the preparation of these soaps is not critical. In batchwise preparations, the only requirement need be that the resin be kept molten. While it is desirable to melt the resin initially to a temperature from about 150–160° C. to insure complete solution of any crystalline phase, fluidity can usually be maintained in an oil bath at 105–115° C. The saponification reaction is exothermic so that the problem becomes one of minimizing the water vapor loss and avoiding excessive foaming.

The reaction may be and usually is carried out at atmospheric pressure. The time required to complete the reaction will vary but will usually not exceed about 20 minutes.

The following examples will serve to illustrate the invention.

Example 1

A potassium soap of disproportionated rosin was prepared in the following manner: One hundred and forty-seven parts of disproportionated wood rosin was heated to the molten state (130° C. to 160° C.). The alkali (41.8 parts of 45% KOH), sodium chloride (3.2 parts), sodium pyrophosphate (0.49 part $Na_4P_2O_7 \cdot 10H_2O$), and diluting water (12.0 parts) were combined and added to the molten resin under constant agitation. During the reaction, agitation was continued and the temperature maintained between 80° C. and 105° C. The reaction was complete in 15 minutes. These amounts of ingredients yield 204.5 parts of soap having the following properties:

Total solids_____percent__ 81.3
Acid number_____ 20.3
Color (20% in butyl Carbitol)_____ $WW_2$ A similar soap, prepared from the same ingredients except that no sodium pyrophosphate was included, had a color of $WG_5$.

Example 2

A potassium soap of a mixture of disproportionated rosin and hydrogenated tallow fatty acids, having pale color, was prepared in the following manner: One hundred and ninety-two parts of disproportionated rosin and 180 parts of hydrogenated tallow fatty acids were heated to the molten state. One hundred and twenty-one parts of 45% potassium hydroxide, 0.75 part of sodium pyrophosphate and 6 parts of diluting water were combined and added to the molten resin-fatty acid mixture under constant agitation. These amounts of ingredients yielded 500 parts of soap having the following properties:

Total solids_____percent__ 82.3
Acid number_____ 22.5
Color (20% in butyl Carbitol)_____ $X_1$ A similar soap from which sodium pyrophosphate was omitted had a color of $WW_4$.

Example 3

A sodium soap of disproportionated rosin, having pale color, was prepared in the following manner: Two hundred and ninety-four parts of disproportionated rosin was heated to the molten state to facilitate reaction with the alkali. The alkali (50 parts of 50% NaOH), potassium chloride (6.2 parts), sodium pyrophosphate (1.0 part $Na_4P_2O_7 \cdot 10H_2O$), and diluting water (58 parts) were combined. The molten rosin was added to the total aqueous phase under constant agitation. The amounts of ingredients defined above yielded 409 parts of soap having the following properties:

Total solids_____percent__ 77.2
Acid number_____ 25.3
Color (20% in butyl Carbitol)_____ $WG_5$ An essentially identical soap from which sodium pyrophosphate was omitted had a color of $N_6$.

Examples 4–13

Sodium and potassium soaps were prepared from four different samples of disproportionated rosin utilizing various polyphosphates as additives. The sodium soaps were prepared following the procedure of Example 3 and the potassium soaps were prepared following the procedure of Example 1. The colors of these soaps were compared with the colors of soaps similarly prepared except that no polyphosphate was added. The results are set forth in Table 1 below.

TABLE 1

| Ex. No. | Additive | Percent Additive (Anhydrous based on resin) | Potassium Soap | Potassium Soap | Sodium Soap | Sodium Soap |
|---|---|---|---|---|---|---|
| 4 | Control | | WW₂ | N₇ | WG₄ | M₅ |
| 5 | Tetrapotassium Pyrophosphate | 0.05 | WW₄ | | | |
| 6 | do | 0.1 | | | X₁₂ | |
| 7 | Sodium Tripolyphosphate | 0.1 | | WW₅ | WW₃ | |
| 8 | Potassium Tripolyphosphate | 0.05 | WM₄ | | | |
| 9 | do | 0.1 | | | | WW₁ |
| 10 | Sodium Acid Pyrophosphate (Na²H²P²O⁴) | 0.1 | WW₇ | WG₅ | WW₁ | |
| 11 | Sodium Hexametaphosphate (Calgon) | 0.1 | | WW₁ | | |
| 12 | Sodium Hexametaphosphate (Quadrofos) | 0.1 | | WW₀ | | |
| 13 | Sodium Pyrophosphate | 0.1 | | | | WG₄ |

Examples 1–13 demonstrate the improvement in color of sodium and potassium soaps of disproportionated rosin and rosin-fatty acid mixtures utilizing polyphosphates. In general, the degree of color improvement is greater in soaps made from darker grades of rosin.

*Examples 14–18*

These examples demonstrate the relative effects of sodium silicate and a polyphosphate, i.e., sodium pyrophosphate on polymerization rate in emulsion polymerization systems. Butadiene-1,3 and styrene were copolymerized utilizing a GR–S 1500 recipe and the rates are reported in terms of hours required to achieve 60% conversion. Mixed rosin-fatty acid soaps were used as the emulsifiers. The data are set forth in Table 2 below.

TABLE 2

| Ex. No. | Type Additive | Percent Additive¹ | Hours/60% Conversion |
|---|---|---|---|
| 14 | None | | 5.7, 5.3, 5.8 |
| 15 | Sodium silicate (Water glass) | 0.2 | 6.8 |
| 16 | do | 0.4 | 7.5 |
| 17 | None | | 6.2, 6.6, 6.4 |
| 18 | Sodium pyrophosphate | 0.2 | 5.9, 6.3, 6.0 |

¹ Percent additive based on rosin-fatty acid mixture.

By a comparison of Examples 14–16, it will be evident that the use of sodium silicate causes polymerization rate to decrease. Examples 17 and 18, on the other hand, show an actual increase in polymerization rate as the result of using the polyphosphate sodium pyrophosphate.

The rosin soaps of the invention may be prepared from the usual rosin materials such as wood or gum rosin, tall oil rosin and the like. They may also be prepared from mixtures of rosin and fatty acids. Mixtures of this type which are satisfactory for use herein are those contained in or derived from tall oil. The rosin or rosin-fatty acid mixtures may be refined in any suitable manner and, for most effective use in aqueous emulsion polymerization processes, are subjected to a disproportionation treatment. This may be effected in any suitable manner as by a heat-treatment in the presence of a catalyst such as iodine, sulfur, sulfur dioxide, platinum, palladium, and the like. A suitable method for effecting disproportionation of rosin is disclosed in U.S. 2,138,183. Rosin-fatty acid mixtures may be similarly treated.

Saponification is effected with an alkali such as sodium hydroxide or potassium hydroxide. The amount of alkali required will vary depending upon the particular rosin or rosin-fatty acid mixture utilized, the degree of saponification desired and so on. Where the soaps are to be used in emulsion polymerization processes, it is preferred to utilize an amount of alkali sufficient to neutralize at least about 70% but no more than about 95% of the rosin.

As previously indicated, the amount of polyphosphate used will usually vary from about 0.05% to about 0.3% by weight, based on the weight of the rosin. Amounts less than 0.05% are usually not effective to produce any appreciable color improvement while amounts in excess of 0.3% effect no further improvement in color, and are usually insoluble. Optimum results are obtained utilizing from about 0.1% to about 0.2% by weight of polyphosphate, based on the weight of the rosin, and this range is preferred.

The solids contents of the soaps herein contemplated may vary from about 50% to about 85%, but, in most cases, will be from about 70% to about 82%. A desired solids content within these ranges may be obtained by properly proportioning the amount of water utilized in the reaction and/or by adjusting the water content of the final product, i.e., by adding or removing water.

It should be understood that the rosin and/or rosin-fatty acid soaps of this invention may include other ingredients customarily included in such products to effect particular results, functions, properties or characteristics. For example, sodium chloride may be included to control viscosity.

It will thus be seen that the present invention provides rosin and rosin-fatty acid soaps having improved color. Moreover, this color improvement is obtained without adverse effect on polymerization rate when such soaps are used in aqueous emulsion polymerization processes.

While specific embodiments of the invention have been described herein, the invention is not to be construed as limited thereto other than as included in the following claims. In these claims it will be understood that the word "rosin" is intended to include various types of rosin such as gum rosin, wood rosin, tall oil rosin and the like which may, if desired, be subjected to various treatments including disproportionation to better adapt them for a particular use.

What I claim and desire to protect by Letters Patent is:

1. The process of preparing an emulsifier adapted for use in aqueous polymerization process which comprises saponifying a material selected from the group consisting of disproportionated rosin and disproportionated rosin-fatty acid mixtures with an aqueous alkali selected from the group consisting of the hydroxides and carbonates of sodium and potassium to form the corresponding soap, said soap containing from about 15% to about 50% water and from about 85% to about 50% solids, and incorporating in said soap from about 0.05% to about 0.3% by weight, based on the weight of rosin, of a material selected from the group consisting of the polyphosphates of sodium and potassium, said amount of polyphosphate being sufficient to improve the color of said soap but insufficient to adversely affect its use as an emulsifier in aqueous emulsion polymerization processes.

2. The process of claim 1 in which the polyphosphate is sodium pyrophosphate.

3. The process of claim 1 in which the polyphosphate is potassium pyrophosphate.

4. The process of claim 1 in which the polyphosphate is sodium acid pyrophosphate.

5. The process of claim 1 in which the polyphosphate is sodium tripolyphosphate.

6. The process of claim 1 in which the polyphosphate is potassium tripolyphosphate.

7. An emulsifier adapted for use in aqueous emulsion polymerization processes comprising a soap selected from the group consisting of the sodium and potassium soaps of disproportionated rosin and disproportionated rosin-fatty acid mixtures, said soap containing from about 15% to about 50% water and from about 85% to about 50% total solids, said total solids including from about 0.05% to about 0.3% by weight, based on the weight of rosin, of a material selected from the group consisting of the polyphosphates of sodium and potassium, said amount of polyphosphate being sufficient to improve the color of said soap but insufficient to adversely affect its use as an emulsifier in aqueous emulsion polymerization processes.

8. An emulsifier adapted for use in aqueous emulsion polymerization processes comprising a potassium soap of disproportionated rosin containing from about 15% to about 50% water and from about 85% to about 50% total solids, said total solids including from about 0.05% to about 0.3% by weight, based on the weight of rosin, of sodium pyrophosphate, said amount of sodium pyrophosphate being sufficient to improve the color of said soap but insufficient to adversely affect its use as an emulsifier in aqueous emulsion polymerization processes.

9. An emulsifier adapted for use in aqueous emulsion polymerization processes comprising a potassium soap of a disproportionated rosin-fatty acid mixture containing from about 0.05% to about 15% to about 50% water and from about 85% to about 50% total solids, said total solids including from about 0.3% by weight, based on the weight of rosin, of sodium pyrophosphate, said amount of sodium pyrophosphate being sufficient to improve the color of said soap but insufficient to adversely affect its use as an emulsifier in aqueous emulsion polymerization processes.

References Cited in the file of this patent
UNITED STATES PATENTS

| | | |
|---|---|---|
| 2,277,730 | Thomas et al. | Mar. 31, 1942 |
| 2,278,352 | Heald | Mar. 31, 1942 |
| 2,310,475 | Thomas et al. | Feb. 9, 1943 |
| 2,402,473 | Van Zile | June 18, 1946 |
| 2,578,366 | Mills | Dec. 11, 1951 |
| 2,648,655 | Vandenberg | Aug. 11, 1953 |
| 2,861,953 | Thurman | Nov. 25, 1958 |

UNITED STATES PATENT OFFICE
CERTIFICATION OF CORRECTION

Patent No. 3,012,975            December 12, 1961

Charles M. Lambert

It is hereby certified that error appears in the above numbered patent requiring correction and that the said Letters Patent should read as corrected below.

Columns 3 and 4, TABLE 1, second column line 7 thereof, for $(Na^2H^2P^2O')$ read -- $(Na_2H_2P_2O_7)$ --; same table column 4 line 2 thereof, for "$WW_4$" read -- $WW_7$ --; same table column 4 line 5 thereof, for "$WM_4$" read -- $WW_4$ --; column 4, line 49, for "process" read -- processes --.

Signed and sealed this 24th day of April 1962.

(SEAL)
Attest:

ESTON G. JOHNSON  
Attesting Officer

DAVID L. LADD  
Commissioner of Patents